(12) United States Patent
Leask

(10) Patent No.: US 9,342,663 B2
(45) Date of Patent: May 17, 2016

(54) DISTRIBUTING MEDIA WITH VARIABLE RESOLUTION AND FORMAT

(75) Inventor: James Marlow Leask, Stittsville (CA)

(73) Assignee: Adobe Systems Incorporated, San Jose, CA (US)

( * ) Notice: Subject to any disclaimer, the term of this patent is extended or adjusted under 35 U.S.C. 154(b) by 2338 days.

(21) Appl. No.: 12/248,766

(22) Filed: Oct. 9, 2008

(65) Prior Publication Data

US 2014/0248001 A1   Sep. 4, 2014

(51) Int. Cl.
  *G06Q 99/00*   (2006.01)
  *G06F 21/10*   (2013.01)
  *G06Q 20/12*   (2012.01)

(52) U.S. Cl.
  CPC ........ *G06F 21/10* (2013.01); *G06F 2221/0731* (2013.01); *G06Q 20/123* (2013.01); *G06Q 20/1235* (2013.01)

(58) Field of Classification Search
  CPC .......................... G06Q 20/123; G06Q 20/1235
  USPC ...................................... 705/50–51
  See application file for complete search history.

(56) References Cited

U.S. PATENT DOCUMENTS

| | | | | |
|---|---|---|---|---|
| 5,892,900 | A * | 4/1999 | Ginter ..................... | G06F 21/10 726/26 |
| 2007/0043667 | A1* | 2/2007 | Qawami .................. | G06F 21/10 705/50 |
| 2008/0039207 | A1* | 2/2008 | Hutchinson-Kay ..... | A63F 13/12 463/42 |
| 2008/0043832 | A1* | 2/2008 | Barkley ......... | H04N 21/234327 375/240 |
| 2008/0155613 | A1* | 6/2008 | Benya ................ | H04N 7/17318 725/89 |
| 2009/0182662 | A1* | 7/2009 | Alkove ................... | G06F 21/10 705/40 |
| 2009/0328123 | A1* | 12/2009 | Alkove ............. | H04N 21/2541 725/114 |

* cited by examiner

*Primary Examiner* — James D Nigh
(74) *Attorney, Agent, or Firm* — Kilpatrick Townsend & Stockton LLP

(57) ABSTRACT

An image processor receives an image. The image processor creates a low-resolution copy of the image for distribution to one or more recipients. Prior to distribution, the image processor produces permission information specifying whether a recipient is enabled to retrieve a high-resolution copy of the image. In addition to transmitting the low-resolution copy of the image to the recipient, the image processor forwards the permission information to the recipient as well. The recipient uses the permission information to determine whether the recipient is enabled to retrieve the high-resolution copy of the image. If enabled, the recipient can retrieve the high-resolution copy of the image. If disabled, the recipient cannot retrieve the high-resolution copy of the image. Accordingly, the permission information transmitted with the low-resolution copy can be used as a way of preventing or allowing access to the higher resolution copy of the image.

14 Claims, 11 Drawing Sheets

DISTRIBUTING MEDIA WITH VARIABLE RESOLUTION AND FORMAT

BACKGROUND

Many conventional software applications allow a user to edit and share digital content such as digital images. For example, conventional systems for photo sharing generally enable a transfer of a user's digital photos over a network, thereby enabling the user to share digital photos with other users. Often, this functionality is provided through websites and applications that facilitate the upload and display of images.

For example, a user can select a set of images that are to be shared with other users. The user uploads the images the user wants to share with the other users and then transmits the set of images to the other users. Upon receipt of the set of images, the other users can download and view the set of images.

Currently, a variety of photo sharing websites are available on the Internet. A user can obtain a user account to a photo sharing website and upload a set of images to the website. In order to share the set of images with other users, the user sends an email via the photo sharing website to the other users informing them that the recipient of the e-mail will be granted access to the set of images at the website. Typically, in order to view the set of images, the other users must also have their own user accounts on the same photo sharing website. Upon logging onto the photo sharing website, the other user's can individually browse and view the images.

Conventional e-mail applications also allow for the transfer of digital images from a user to one or more recipients. For example, the user can attach one or more digital images to an e-mail addressed to the recipient. When the recipient receives the e-mail, the recipient can view a thumbnail of each image in the body of the e-mail and later download each image from a server that hosts the e-mail application.

Conventional e-mail applications often have limits in the total size of attachments that may be transferred with an email. The maximum limit is typically far smaller than the total size required to send multiple high-resolution images to a recipient.

BRIEF DESCRIPTION

Current conventional systems suffer from a variety of deficiencies. For example, conventional systems allow a user to send a set of images to a recipient. However, if each image in the set has a high-resolution, then the size of each image file that is transmitted to the recipient generally will be very large. Thus, transmission of the entire set of images from the user to the recipient can consume a large amount of communication bandwidth as well as require significant storage resources to store the corresponding image data.

Conventional systems therefore incur the cost of transmitting each high-resolution image file regardless of whether or not the recipient is even interested in performing an operation with respect to such image content. This is a waste of transmission bandwidth. That is, if the recipient of the large images is only interested in printing, viewing, and/or editing one image from a group of multiple received images, then sending all of the image files to the recipient turns out to be very inefficient and a poor use of network and storage resources.

Techniques discussed herein significantly overcome the deficiencies of conventional applications such as those discussed above. As will be discussed further, some embodiments herein are directed to more efficient distribution and management of image content.

For example, in accordance with one embodiment, an image processor receives an image. The image manager creates a low-resolution copy of the image for distribution over a communication link to a recipient. Prior to distribution, the image manager produces permission information specifying whether the recipient is enabled to retrieve a high-resolution copy of the image. In addition to transmitting the low-resolution copy of the image to the recipient, the image processor forwards the permission information to the recipient as well. The recipient uses the permission information to determine whether the recipient is enabled to retrieve the high-resolution copy of the image. If so enabled as specified by the permission information, the recipient can retrieve the high-resolution copy of the image. If not enabled, the recipient cannot retrieve the high-resolution copy of the image. Accordingly, the permission information transmitted with the low-resolution copy of the image can be used to prevent or allow access to the higher resolution copy of the image.

As its name suggests, the high-resolution copy of the image has a higher resolution than the low-resolution copy of the image and thus provides a more detailed viewing of the image when displayed on a respective display screen.

By way of a non-limiting example, the permission information can be embedded in a file including the low-resolution copy of the image. As an alternative, the permission information can be stored in a separate metadata file associated with the low-resolution copy of the image.

As mentioned above, regardless of how the permission information is associated with the low-resolution copy of the image, both the low-resolution copy of the image and the permission information can be sent to the recipient to control subsequent retrieval of a high-resolution copy of the image.

Note that an image manager can send the low-resolution copy of the image to a number of recipients. For each recipient, the image manager can create different permission information indicating whether a respective recipient is able to retrieve the high-resolution copy of the image.

More specifically, the image manager can produce first permission information specifying that a first recipient is able to retrieve or apply operations to a corresponding high-resolution copy of the image. The image manager can produce second permission information specifying that a second recipient is not able to retrieve or apply operations to the high-resolution copy of the image.

The image manager sends the low-resolution copy of the image and the first permission information to the first recipient. The image manager sends the low-resolution copy of the image and the second permission information to the second recipient. Upon receipt of the low-resolution copy of the image and the first permission information by the first recipient, the first recipient is able to retrieve and view the high-resolution copy of the image. Upon receipt of the low-resolution copy of the image and the second permission information by the second recipient, the second recipient is prevented from retrieving and viewing the high-resolution copy of the image.

The permission information can include additional information specifying which instructions or operations if any can be applied to the low-resolution and/or high-resolution copy of the image. For example, the permission information can specify what operations or instructions, if any, the recipient is enabled to carry out with respect to the image content.

In certain situations, the low-resolution copy of the image can be sufficient for many actions the recipient may want to perform on the image's content, such as displaying it on a computer screen or making a small 4×6 print of the image. In such an instance, the recipient may need only the low-resolution copy of the image.

In other instances, operations applied to the low-resolution copy of the image can require retrieval and application of the operations to the high-resolution copy of the image. To facilitate execution of such commands, a monitor function at the recipient detects circumstances in which the recipient attempts to perform an action that requires retrieval of the high-resolution copy of the image. Operations such as cropping the image, editing the image, making a large print, etc., may require retrieval of the higher resolution copy of the image. If the recipient attempts to execute an operation that requires a high-resolution copy of the image, but the recipient is not enabled to retrieve the high-resolution copy of the image, a message can be displayed to the requestor to indicate that the requested operation is not supported and/or that the high-resolution copy of the image cannot be retrieved.

As an example embodiment, upon detecting the recipient's selection to perform an action on the image's content that requires a copy of the image at a higher resolution, a renderer function at the recipient utilizes the permission information associated with the low-resolution copy of the image to identify what operations are enabled and potentially whether retrieval of the high-resolution copy of the image is necessary to carry out a selected operation. If the recipient is enabled to retrieve the high-resolution copy of the image, the renderer sends a request to obtain the high-resolution copy of the image.

In one embodiment, upon receipt of the high-resolution copy of the image, the recipient carries out execution of the operation on the high-resolution copy of the image rather than carry out the selected operation on the low-resolution copy of the image. As mentioned above, such embodiments reduce unwanted network traffic as well as reduce an amount of storage required for images because copies of images are retrieved and processed on an as-needed basis.

If the recipient is not interested in the content of the low-resolution copy of the image, then the bandwidth costs that would have been incurred by initially transmitting the high-resolution copy of the image are avoided altogether since the recipient will most not attempt to perform any actions which require processing image data in a higher resolution. However, as mentioned above, if the recipient views the low-resolution copy of the image and decides to make further use of that image's content via an action that does require image content with a higher resolution or different format, the bandwidth costs associated with transmitting a larger-sized image file will be worth incurring. In other words, bandwidth for transmitting high-resolution copies of images is utilized in appropriate circumstances when the high-resolution copy is requested.

Note that other embodiments disclosed herein include any type of computerized device, workstation, handheld or laptop computer, or the like configured with software and/or circuitry to process any or all of the method operations disclosed herein.

Other embodiments disclosed herein include software programs to perform the steps and operations summarized above and disclosed in detail below. One such embodiment comprises a computer program product that has a computer-storage medium (e.g., tangible computer-readable medium) including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in software and hardware such as those manufactured by Adobe Systems Incorporated of San Jose, Calif., U.S.A.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note also that this Brief Description section herein does not specify every embodiment and/or incrementally novel aspect of the present disclosure or claimed invention. Instead, this Brief Description only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features and advantages of the invention will be apparent from the following more particular description of embodiments of the methods and apparatus for an image transmitter and a renderer, as illustrated in the accompanying drawings and figures in which like reference characters refer to the same parts throughout the different views. The drawings are not necessarily to scale, with emphasis instead being placed upon illustrating the embodiments, principles and concepts of the methods and apparatus in accordance with the invention.

DETAILED DESCRIPTION

Figure 1:
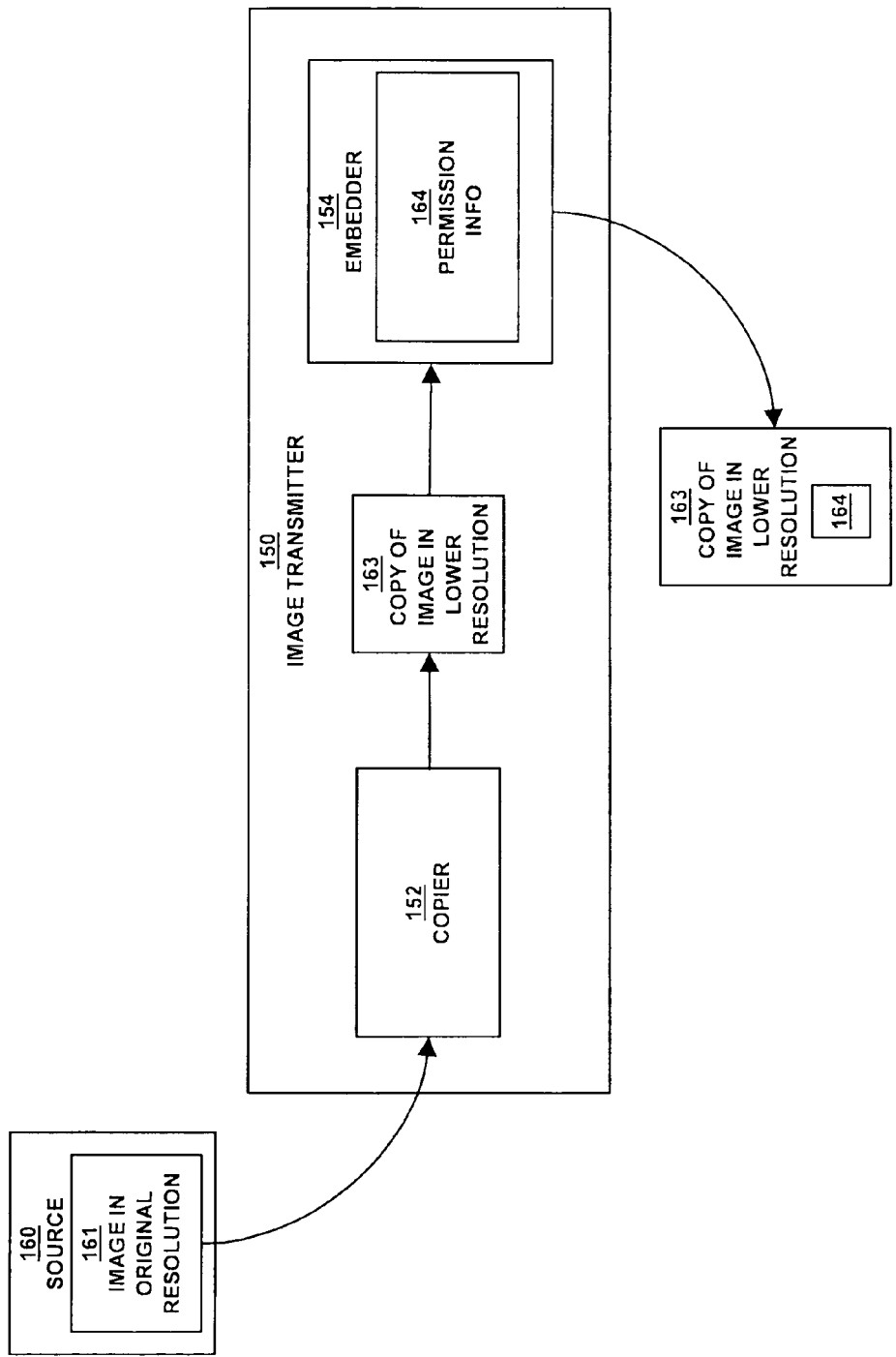
FIG. 1 is an example block diagram of an image transmitter and embedding of a permission level in a copy of an image according to embodiments herein.

FIG. 1 is an example block diagram of an image transmitter 150 for associating permission information with image content according to embodiments herein. As discussed herein, a copy of an image can have a different resolution than an original image. Permission information can be created for threshold copy of the image. Among other things, the permission information can specify whether a recipient of the copy of the image is enabled to subsequently retrieve an original image from which the copy was derived, whether the recipient is enabled to retrieve other copies of the original image having a different resolution than the resolution of the copy received with the permission information, etc.

More specifically, as illustrated in FIG. 1, image transmitter 150 receives an image 161 from source 160. The image transmitter 150 passes the original image 161 through copier 152 to create a low-resolution image 163 from image 161 for subsequent distribution to one or more recipients.

When displayed, the low-resolution image 163 provides less visual details than the original version of the image 161.

Prior to distribution, the image transmitter 150 passes the low-resolution image 163 through an embedder 154 to associate permission information 164 with it. In an example embodiment, the permission information 164 specifies whether a recipient of the low-resolution image 163 is enabled to carry out image operations such as retrieval of the original image 161 having a higher resolution.

The permission information can specify a resolution level or resolution range in which a respective recipient is enabled to retrieve higher-resolution versions of the received low-resolution image 163. Each of multiple different recipients can be enabled to retrieve copies having different resolutions. Thus, the permission information can define a perm level indicating a resolution of retrievable copies.

One application of the system as described herein is a publishing environment including multiple designers. The designers can be allowed to retrieve and utilize low-resolution copies of images, while a lead design manager can be allowed to obtain and view higher-resolution copies of images.

As mentioned, the image transmitter 150 passes the original image 161 through a copier 152. The copier 152 creates low-resolution image 163 for selective distribution to one or more recipients. Note that the copier 152 can be configured to create the low-resolution image 163 in a different format than the original image 161. For example, the original image 161 can be encoded according to a GIF (Graphics Interchange Format). The copier 152 can create the low-resolution image 163 in accordance with any of multiple formats such as a JPEG (Joint Photographic Experts Group) format. Note that the copier 152 also can format create the low-resolution image 163 using the format associated with image 161.

In one embodiment, the source 160 is remotely located with respect to the image transmitter 150. In other embodiments, the source 160 is collocated with the image transmitter 150.

Figure 2:
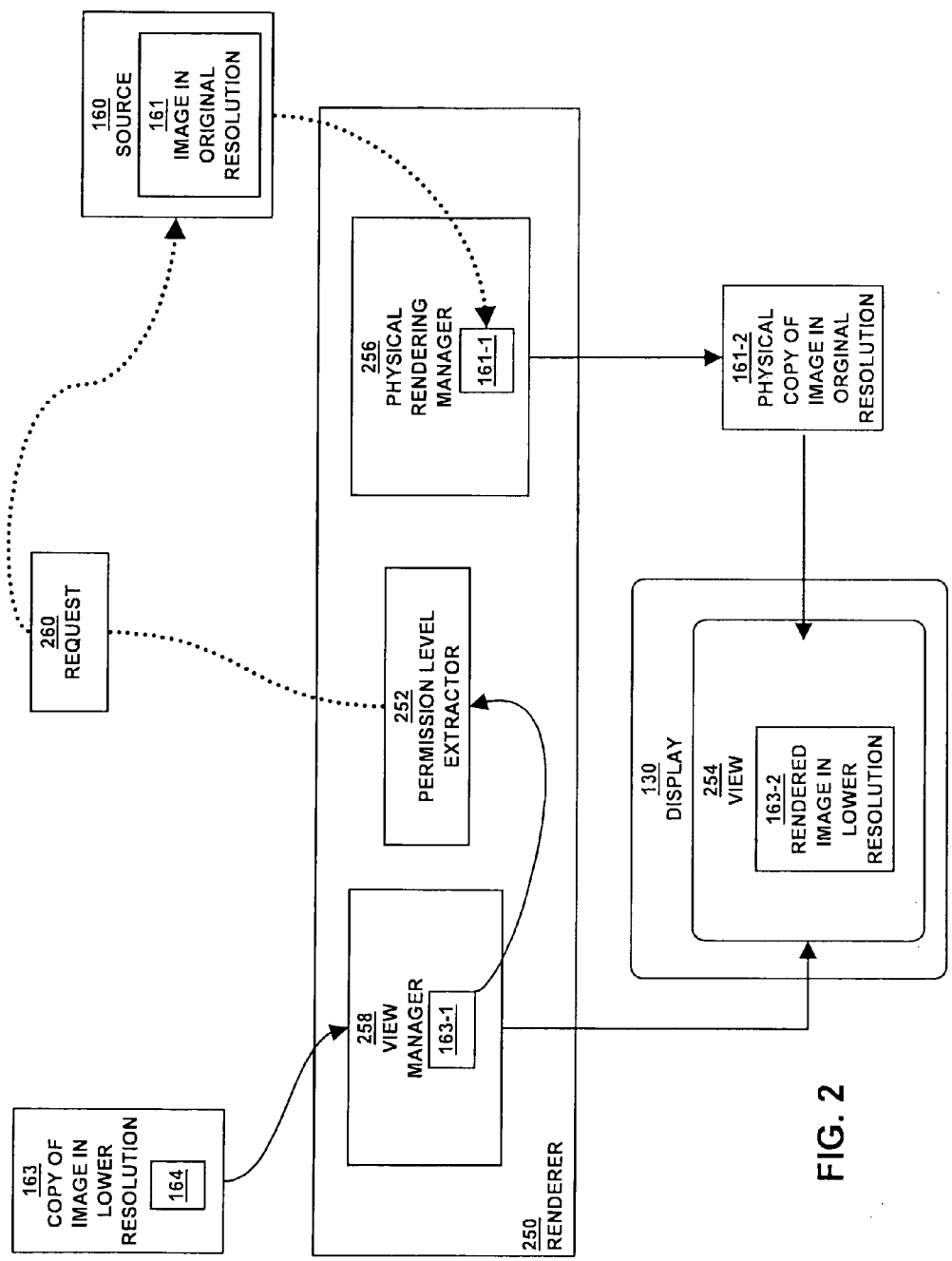
FIG. 2 is an example block diagram of an image transmitter creating a high-resolution copy of an image according to embodiments herein.

FIG. 2 is an example block diagram illustrating distribution of image data and permission information according to embodiments herein.

As shown, the renderer 250 receives the low-resolution image 163 and respective permission information 164 transmitted by image transmitter 150. The view manager 258 of the renderer 250 initiates display of the low-resolution image 163 on display screen 130. A viewer can apply different commands to the rendered image 163-2 on display screen 130. As discussed below, execution of some commands can be prevented while others are allowed.

The permission level extractor 252 analyzes the permission information to identify which commands can be executed with respect to the received low-resolution image 163.

Assume that the viewer applies a command requiring retrieval of a higher-resolution version of image 161 than the rendered low-resolution image 163-2 on display screen 130. In response to receiving such input, and since the permission information 164 enables the viewer to retrieve a higher resolution of image 161, the renderer 250 generates request 260. The renderer 250 transmits the request 260 to source 160 for retrieval of a higher resolution version of image 161.

In response to receiving the request 260, the source 160 forwards a higher resolution version of image 161 to renderer 250 that, in turn, executes the command with respect to the higher resolution copy on display screen 130. In other words, the source 160 can initiate distribution of the original image 161 to renderer 250 for further processing of image content by the renderer 250.

Thus, the renderer 250 can detect that the recipient of the low-resolution image 163 has selected an action relative to viewing a rendered version of the low-resolution image 163 via a view 254 on display screen 130.

The renderer 250 can detect that the recipient wishes to perform an action that requires a copy of the image at higher resolution such as for printing a large physical copy of the image 161. As discussed above, the renderer 250 analyzes the permission information 164 embedded or associated with the low-resolution image 163 and uses permission level extractor 252 to extract and analyze the permission information 164.

Figure 3:
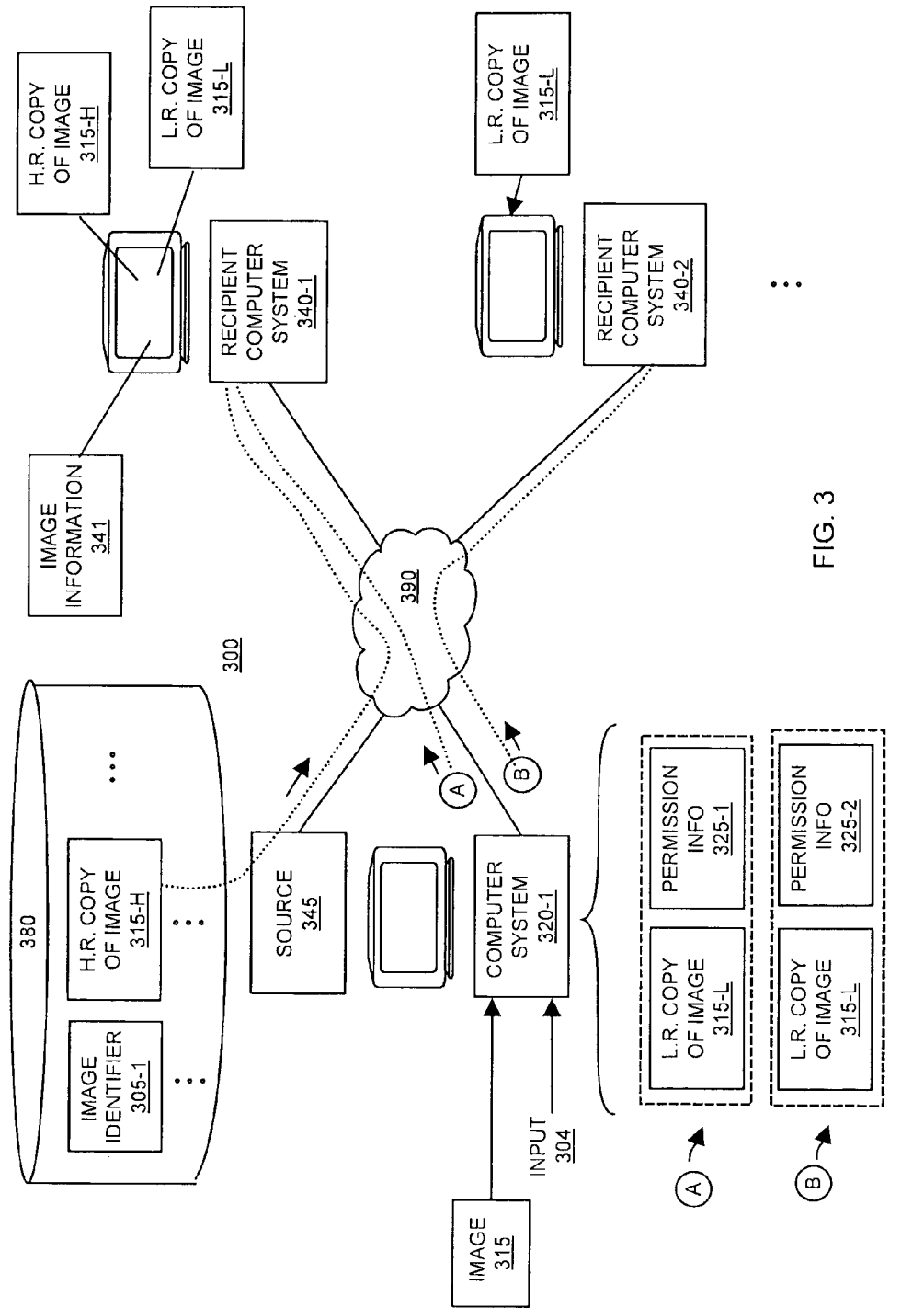
FIG. 3 is an example block diagram illustrating a system supporting conveyance of images and related information according to embodiments herein.

FIG. 3 is an example diagram of system 300 illustrating image management and distribution according to embodiments herein.

As shown, system 300 includes computer system 320-1 operated by a corresponding resource such as a user that supplies image data for processing by computer 320-1. As discussed in more detail below, a respective user of computer system 320-1 supplies input 304.

More specifically, the user or other source supplies image 315 to computer system 320-1. Based on input 104 such as a storage command, the computer system 320-1 initiates generation and storage of a high-resolution copy of the image 315-R in repository 380. In one embodiment, the computer system 320-1 stores a copy of image 315 as a high-resolution copy of the image 315-H.

If desired, the low-resolution copy of the image 315-L also can be stored in the repository 380. Thus, a family of image content and related information associated with image 315 can be stored in repository 380.

In addition to storing of image data in repository 380, the respective image data or family can be indexed via use of one or more image identifiers. In the context of the present example, image identifier 305-1 can be assigned to a family of image content including the high-resolution copy of image 315-H. As discussed below, the identifier 305-1 can be used to specify which image data to retrieve from repository 380.

In addition to creating the high-resolution copy of the image 315-H, note that the computer system 320-1 creates a low-resolution copy of image 315-L. As its name suggests, the low-resolution copy of the image 315-L has a lower resolution than an original resolution of the image 315. The high-resolution copy of the image 315-H therefore has a higher resolution than a respective resolution of the low-resolution copy of the image 315-L.

The user of computer system 320-1 can provide further input 304 specifying which of any recipient computer systems 340 will receive the low-resolution copy of the image 315-L. Distribution of content over communication media such as network 390 is not limited and can include communication modes such as e-mail, internet browsers, etc., as well as any distributed software enabling sharing and viewing of content between parties.

For those recipient computer systems that will be receiving the low-resolution copy of the image 315-L, the user of computer system 320-1 also provides input specifying whether one or more recipients such computer system 340-1 and/or computer system 340-2 will be enabled to subsequently retrieve the high-resolution copy of the image 315-H stored in repository 380. As discussed below, the computer system 320-1 generates corresponding permission information 325 for transmission along with the low-resolution copy of the image 315-L. The permission information 325 can specify whether a respective recipient computer system in system 300 is enabled to carry out different types of operations with respect to received or remotely stored image data.

Assume in this example that the user of computer system 320-1 would like to enable recipient computer system 340-1 to retrieve the high-resolution copy of the image 315-H but would like to prevent the recipient computer system 340-2 from retrieving the high-resolution copy of the image 315-H. As mentioned above, assume that the user at computer system 320-1 would like to send the low-resolution copy of the image 315-L to both the recipient computer system 340-1 and recipient computer system 340-2 for viewing.

By way of a non-limiting example, the computer system 320-1 can control which operations or instructions that a respective recipient computer system can execute with respect to the high-resolution copy of the image 315-H. In one embodiment, as generally mentioned above, this can be achieved by generating permission information 325 to include a list of operations specifying which operations a corresponding recipient is enabled to execute. The recipient computer systems can be configured to execute an algorithm that utilizes the permission information 325 as a way of determining which of different commands can be executed with respect to the low-resolution copy of the image 315-L and/or high-resolution copy of the image 315-H.

To facilitate distribution of image data, the permission information 325 can include a source identifier or source address specifying the source 345 as a resource from which copies of related images can be retrieved. The source identifier, thus, can be used to notify one or more respective recipient computer systems of a location in which the high-resolution copy of the image 315-H is stored for possible retrieval.

In a further example embodiment, note that the permission information 325 also can include an image identifier specifying a respective index value pointing to data including the high-resolution copy of the image 315-H in the repository 380. In such an embodiment, the image identifier enables the respective recipient computer system to identify which image data to retrieve from source 345.

In yet a further example embodiment, the computer system 320-1 can encode the permission information 325 to include format information specifying a corresponding format in which the high-resolution copy of the image 315-H is to be formatted upon retrieval upon retrieval of the high-resolution copy of the image 315-H by the recipient computer system. Also, if desirable, the permission information 325 can be encoded to indicate the different types of formats that a respective recipient can potentially retrieve the high-resolution copy of the image 315-H stored in repository 380. In the latter embodiment, a recipient can select which format in the permission information in which to retrieve the high-resolution copy of the image 315-H.

Further information can be stored in the permission information 325. For example, the computer system 320-1 can generate the permission information 325 to specify whether the high-resolution copy of the image 315-H can be edited by a recipient computer system. Additionally, the computer system 320-1 can generate the permission information 325 to specify whether corresponding image such as the high-resolution copy of the image 315-H can be printed by the recipient computer system.

Again, note that the generation of the permission information 325 to include a source identifier, image identifier, list of allowed operations, etc., is shown by way of non-limiting example only and that any portion of these parameters as well as other suitable parameters can be included in the permission information 325 to control recipient computer systems.

In furtherance of the above example to control dissemination of image data such as the low-resolution copy of the image 315-L and high-resolution copy of the image 315-H, the computer system 320-1 generates message information A for transmission to recipient computer system 340-1. Computer system 320-1 generates message information B for transmission to recipient computer system 340-2.

Recall that the received input 304 specifies which recipient computer systems will receive the low-resolution copy of the image 315-L as well as which of such recipient computer systems will be enabled to retrieve the high-resolution copy of the image 315-H. In the context of the present example, the recipient computer system 340-1 will be enabled to apply different commands to the image information while the recipient computer system 340-2 will be disabled from retrieving the high-resolution copy of the image 315-H.

Computer system 320-1 creates message information A for transmission to recipient computer system A and message information B for transmission to recipient computer system 340-2.

After creating the message information, the computer system 320-1 initiates distribution of the message information to recipient computer systems. More specifically, in accordance with the present example, the computer system 320-1 transmits message information A over network 390 to recipient computer system 340-1. The computer system 320-1 transmits message information B over network 390 to recipient computer system 340-2.

As discussed above, any suitable method can be used to transmit information from computer system 320-1 to recipient computer systems.

For routing purposes, the computer system 320-1 can encode message A to include address information associated with computer system 340-1 for routing message A over network 390 to recipient computer system 340-1. Likewise, the computer system 320-1 can include address information associated with computer system 340-2 for routing message B over network 390 to recipient computer system 340-2.

As discussed in more detail below, source 345 can subsequently initiate distribution of one or more high-resolution copies of the image to recipient computer system 340-1 in response to receiving a request to do so by a respective authorized recipient computer system.

Source 345 can be collocated or be part of computer system 320-1 or be located at a remote server site with respect to the computer system 320-1.

Recipient computer system 340-1 receives the low-resolution copy of the image 315-L in message information A and enables display of the low-resolution copy of the image 315-L for viewing. In one embodiment, the low-resolution copy of the image includes graphical information specifying how to display a rendition of the low-resolution copy of the image on a respective display screen. For example, the recipient computer system utilizes the graphical information in the file to display a rendition of the low-resolution copy of the image on the display screen for viewing by a user at recipient computer system 340-1.

By way of a non-limiting example, the permission information 325-1 can be embedded in a same file as the low-resolution copy of the image or it can be created and stored as a separate metadata file apart from the low-resolution copy of the image.

In addition to enabling display of the low-resolution copy of the image, the recipient computer system 340-1 analyzes the received permission information 325-1 associated with the low-resolution copy of the image. The step of analyzing can be done before or after application of one or more commands to the received low-resolution copy of the image.

As previously discussed, the permission information 325-1 can be configured to specify whether the recipient computer system 340-1 has permission or is authorized to access the high-resolution copy of the image.

In one embodiment, a user of recipient computer system 340-1 can apply an input command with respect to the rendition of the low-resolution copy of the image on the display screen to view image information 341 including different operations that can be applied to the low-resolution copy of the image 315-L and/or high-resolution copy of the image 315-H. For example, in response to right-clicking a computer mouse while a respective cursor of the mouse is over the image or other display region, the recipient computer system 340-1 displays a listing of allowed operations as specified by the permission information 325-1. Accordingly, a user at recipient computer system 340-1 can be apprised of the different operations that the recipient computer system 340-1 can apply to the image. Recipient computer system 340-2 can perform a similar function of providing notification that the user of recipient computer system 340-2 is prevented from retrieving or applying commands to the high-resolution copy of the image 315-H.

More specifically, to identify allowed operations, the recipient computer system 340-1 can analyze the permission information 325-1 to identify a set of allowable operations. By way of a non-limiting example, the list of allowable operations can specify whether the recipient computer system is enabled to execute print commands, edit commands, retrieval commands, etc., with respect to the received image.

As an example, assume that based on analyzing the permission information 325-1, the recipient computer system 340-1 detects that the recipient is authorized to print the high-resolution copy of the image 315-H. In such an instance, the recipient computer system 340-1 enables the recipient to retrieve and print the high-resolution copy of the image 315-H.

As another example, assume that based on analyzing the permission information 325-1, the recipient computer system 340-1 detects that the recipient is authorized to edit the high-resolution copy of the image 315-H. In such an instance, the recipient computer system 340-1 enables the recipient to edit the retrieve and subsequently edit the high-resolution copy of the image 315-H.

In addition to specifying allowable operations, note that displayed image information 341 can include additional information for viewing such as an identity of the source 345 storing respective image data, formats in which the respective image can be retrieved, availability of different resolutions of the image, etc. Thus, a recipient can be apprised of additional useful information.

As previously discussed, if so enabled by permission information 340-1, one or more display and/or image management applications running on recipient computer system 340-1 can initiate retrieval of the high-resolution copy of the image 315-H in response to receiving an input command applied to the rendition of the low-resolution copy of the image. For example in response to receiving input at recipient computer system 340-1 applied to a displayed rendition of the low-resolution copy of the image 315-L, the recipient computer system 340-1 retrieves the high-resolution copy of the image 315-H and applies the received command to the high-resolution copy of the image 315-H. As previously discussed, retrieval depends on whether the recipient has permission to retrieve one or more higher-resolution copies of the image available from the source 345.

To carry out the embodiment above, the recipient computer system 340-1 can execute a monitoring function that is configured to monitor commands applied to a rendition of the low-resolution copy of the image 315-L displayed at the recipient computer system 340-1. Upon detecting application of a command such as a print or edit command requiring a higher resolution copy of the image 315-H, the monitor function can notify a fetcher of recipient computer system 340-1 to retrieve the high-resolution copy of the image. After retrieval of the high-resolution copy of the image 315-H, the recipient computer system 340-1 carries out the received command by applying the received command to the high-resolution copy of the image 315-H. Thus, as discussed above, embodiments herein can relieve network congestion because the recipient computer system 340-1 does not receive the high-resolution copy of the image 315-H until prompted by a recipient.

As an added level of security, the sender computer system 320-1 may require that a respective recipient computer system 340 provide appropriate password information prior to dissemination of the high-resolution copy of the image 315-H.

For example, prior to distributing the high-resolution copy of the image 315-H by source 345, the recipient computer system 340-1 can receive a message from the source 345 requesting submission of authorization information by the recipient requesting the higher-resolution copy of the image 315-H. The authorization may be a password that must be provided by the recipient computer system 340-1 in order to retrieve the high-resolution copy of the image 315-H. Assuming the user at recipient computer system 340-1 knows and provides the appropriate authorization information to the source when challenged, the recipient computer system 340-1 transmits the authorization information to the source 345. Thereafter, the source 345 transmits the image information for receipt by recipient computer system 340-1. If recipient computer system 340-1 forwards message A to another party, the receiving party can be prevented from retrieving the high-resolution copy of the image 315-H from source 345 unless they know the appropriate password.

Thus, the source 345 can be configured to perform operations of: transmitting a request to the recipient computer system 340-1, the request challenging the recipient computer system 340-1 to provide authorization information; receiving the authorization information from the recipient computer system 340-1; verifying the authorization information; and transmitting the high-resolution copy of the image 315-H to the recipient computer system 340-1.

In one embodiment, to carry out a command with respect to the image, the recipient computer system 340-1 can analyze the permission information 325-1 to identify a source identifier specifying an address of source 345 from which to retrieve the high-resolution copy of the image if so desired.

The recipient computer system 340-1 initiates retrieval of the high-resolution copy of the image by transmitting a request over network 390 to the source 345 for retrieval of the high-resolution copy of the image 315-H. The request can include the source identifier specifying an address of the source 345 from which image data will be retrieved. The request also can include an image identifier specifying a respective index value pointing to the high-resolution copy of the image 315-H in the repository 380. The request also can include a format identifier specifying a format in which the high-resolution copy of the image 315-H is to be transmitted to the requesting recipient.

In yet further embodiments, to retrieve higher resolution image data, the request generated by recipient computer system 340-1 can include a resolution identifier specifying a resolution of the image copy being retrieved. The source 345 can be configured to retrieve the resolution parameter from the request, generate a copy of the image having a resolution as specified by the received resolution parameter, and transmit the appropriate resolution of the image as specified by the resolution identifier to the recipient computer system 340-1. This latter embodiment can also help reduce network congestion because a highest resolution image is not always needlessly sent over the network 390. Instead, the source 345 sends an appropriate resolution of the image 315 to the requester.

As previously discussed, computer system 320-1 also initiates transmission of message information B over network 390 to recipient computer system 340-2. The recipient computer system 340-2 analyzes the permission information 325-2. Responsive to detecting that the recipient computer system 340-1 is not authorized to retrieve any of one or more higher resolution copies of the image at source 345, the recipient computer system 340-2 prevents retrieval of the higher resolution copies of the image by the recipient.

Figure 4:
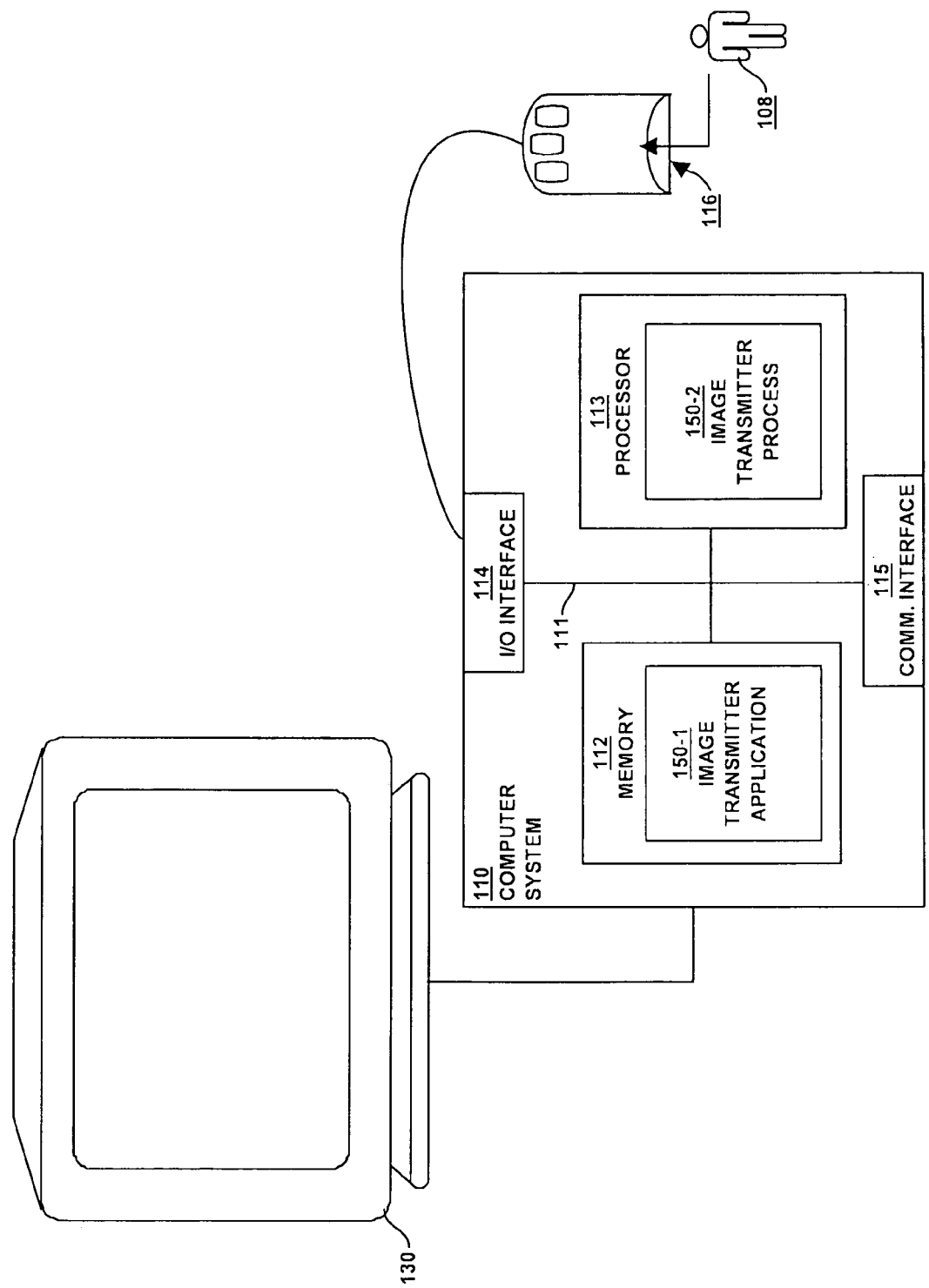
FIG. 4 is an example block diagram illustrating an architecture of a computer system for executing an image transmitter application and/or an image transmitter process according to embodiments herein.

FIG. 4 is an example block diagram illustrating an architecture of a computer system 110 that executes, runs, interprets, operates or otherwise performs an image transmitter application 150-1 and/or image transmitter process 150-2. The image transmitter process can be an executing version of an image transmitter 150 as controlled or configured by user 108 according to embodiments herein.

Note that the computer system 110 may be any type of computerized device such as a personal computer, a client computer system, workstation, portable computing device, console, laptop, network terminal, etc. This list is not exhaustive and is provided as an example of different possible embodiments.

In addition to a single computer embodiment, computer system 110 can include any number of computer systems in a network environment to carry the embodiments as described herein.

As shown in the present example, the computer system 110 includes an interconnection mechanism 111 such as a data bus, motherboard or other circuitry that couples a memory system 112, a processor 113, an input/output interface 114, and a display 130. If so configured, the display 130 can be used to present a graphical user interface of the image transmitter 150 to user 108. An input device 116 such as one or more user/developer controlled devices such as a keyboard, mouse, touch pad, etc., couples to the computer system 110 and processor 113 through an input/output (I/O) interface 114.

The computer system 110 can be a client system and/or a server system. As mentioned above, depending on the embodiment, the image transmitter application 150-1 and/or the image transmitter process 150-2 can be distributed and executed in multiple nodes in a computer network environment or performed locally on a single computer.

During operation of the computer system 110, the processor 113 accesses the memory system 112 via the interconnect 111 in order to launch, run, execute, interpret or otherwise perform the logic instructions of the image transmitter application 150-1. Execution of the image transmitter application 150-1 in this manner produces the image transmitter process 150-2. In other words, the image transmitter process 150-2 represents one or more portions or runtime instances of the image transmitter application 150-1 (or the entire application 150-1) performing or executing within or upon the processor 113 in the computerized device 110 at runtime.

The image transmitter application 150-1 may be stored on a computer storage medium (such as a floppy disk), hard disk, electronic, magnetic, optical, or other computer readable medium. It is understood that embodiments and techniques discussed herein are well suited for other applications as well.

Those skilled in the art will understand that the computer system 110 may include other processes and/or software and hardware components, such as an operating system. Display 130 need not be coupled directly to computer system 110. For example, the image transmitter application 150-1 can be executed on a remotely accessible computerized device via the communication interface 115.

It is understood that recipient computer systems 340 can be configured in a similar manner as computer system 110. For example, the recipient computer systems 340 can be configured to execute, run, interpret, operate or otherwise perform the operations as described herein to enable a recipient to view and retrieve image data as described herein.

As discussed above, embodiments herein are useful in applications in which a respective user of computer system 320 would like to distribution of image data to a number of sources. Transmission of the low-resolution image enables the recipient to decide whether they would like to view a more detailed version of the image prior to actually receiving the high-resolution version of an image. Certain parties can be prevented from retrieving the high-resolution image.

For example, a user at computer system 320 may have an image he wishes to share with a family member and a friend. However, the user wants to be able to control what the family member and the friend can do with the content depicted in the image. In addition, the user wants to allow the family member to perform actions that are different than the actions the friend is allowed to perform.

The user selects a permission information specific to the family member. The image transmitter 150 creates a low-resolution copy of the image and associates the permission information in the low-resolution copy of the image.

The image transmitter 150 sends the low-resolution copy of the image to the family member. Since the image transmitter 150 sends an image copy having a low-resolution, the image transmitter 150 incurs less bandwidth cost than if the image transmitter 150 sent a copy of the image having the image's original resolution.

The family member receives the low-resolution copy of the image at a recipient computer system of the family member. The recipient computer system extracts the permission information from the low-resolution copy of the image. The permission level defines various actions the family member is allowed to perform with respect to the content of the image. For example, the permission level allows the family member to view the low-resolution copy of the image.

The permission level also provides the family member permission to request and receive a second copy of the image having the image's original resolution from the image transmitter (or a source of the image). Further, the permission level allows the family member to generate a physical copy of the image having the image's original resolution. Thus, because the embedded permission level defines actions the family member can perform with respect to a second copy of the image in the original resolution, the bandwidth costs associated with sending and receiving the image in its original resolution are incurred only when the family member decides that having the image in its original resolution is desirable.

With regard to sharing the image with the friend, the user selects a second permission level specific to the friend. The image transmitter 150 makes a second low-resolution copy of the image and embeds the second permission level in the second low-resolution copy of the image. The image transmitter 150 sends the second low-resolution copy of the image to the friend.

The friend receives the second low-resolution copy of the image at a recipient computer system associated with the friend. The recipient computer system extracts the second permission level from the second low-resolution copy of the image. The second permission level defines various actions the friend is allowed to perform. For example, the permission level allows the friend to view the second low-resolution copy of the image. However, as opposed to the permission level granted to the family member, the second permission level may not allow the friend to request and receive another copy of the image having the image's original resolution from the image transmitter (or a source of the image). Further, the second permission level may not allow the friend to generate a physical copy of the image having the image's original resolution.

Thus, embodiments herein make efficient use of bandwidth since they transmit high-resolution images only to those recipients who are both interested in actually obtaining high-resolution images and have been given permission to request and receive the high-resolution images.

FIG. 5 through FIG. 8 illustrate various embodiment of the image transmitter 150. The rectangular elements in flowcharts 500, 600, 700, 800 denote "processing blocks" and represent computer software instructions or groups of instructions upon a computer readable medium. Additionally, the processing blocks represent steps performed by hardware such as a computer, digital signal processor circuit, application specific integrated circuit (ASIC), etc.

Flowcharts 500, 600, 700, 800 do not necessarily depict the syntax of any particular programming language. Rather, flowcharts 400, 500, 600, 700 illustrate the functional information one of ordinary skill in the art requires to fabricate circuits or to generate computer software to perform the processing required in accordance with the present invention.

It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

Figure 5:
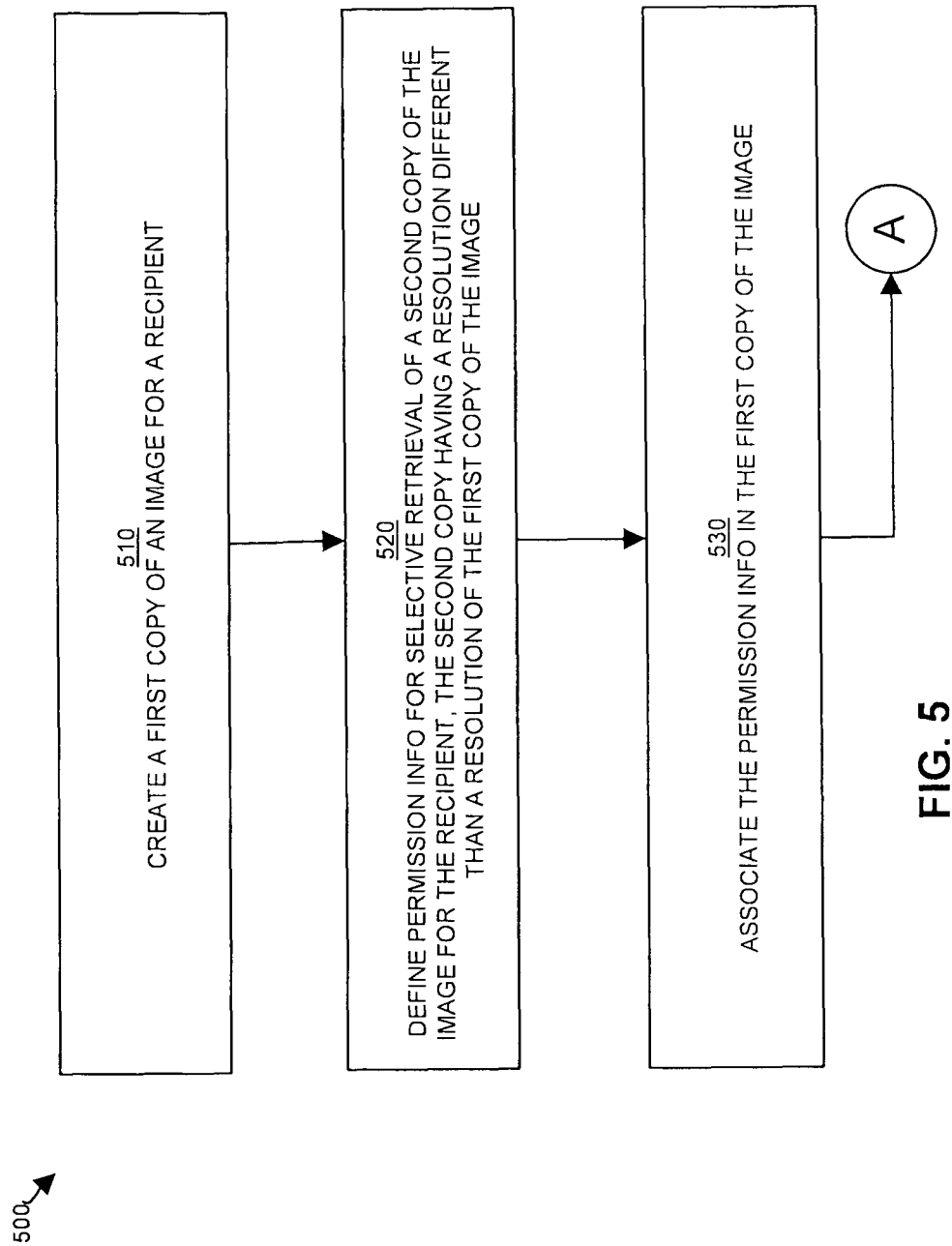
FIG. 5 is a flowchart of an example of processing steps performed by an image transmitter to embed/associate permission information with a copy of an image according to embodiments herein.

FIG. 5 is a flowchart 500 of example processing steps performed by the image transmitter 150 to associate permission information 164 with a copy of an image according to embodiments herein.

At step 510, the image transmitter 150 creates a low-resolution copy of an image 161 for distribution to a recipient. The low-resolution copy of the image 161 has a resolution that is lower than the resolution of an original, high-resolution version of the image 161. The first copy of the image 161 can have a format that is different than a format of the original version of the image 161.

At step 520, the image transmitter 150 defines permission information 164 indicating whether a high-resolution copy of the image 161 can be retrieved by the recipient.

At step 530, the image transmitter 150 associates the permission information with the low-resolution copy of the image 161.

Figure 6:
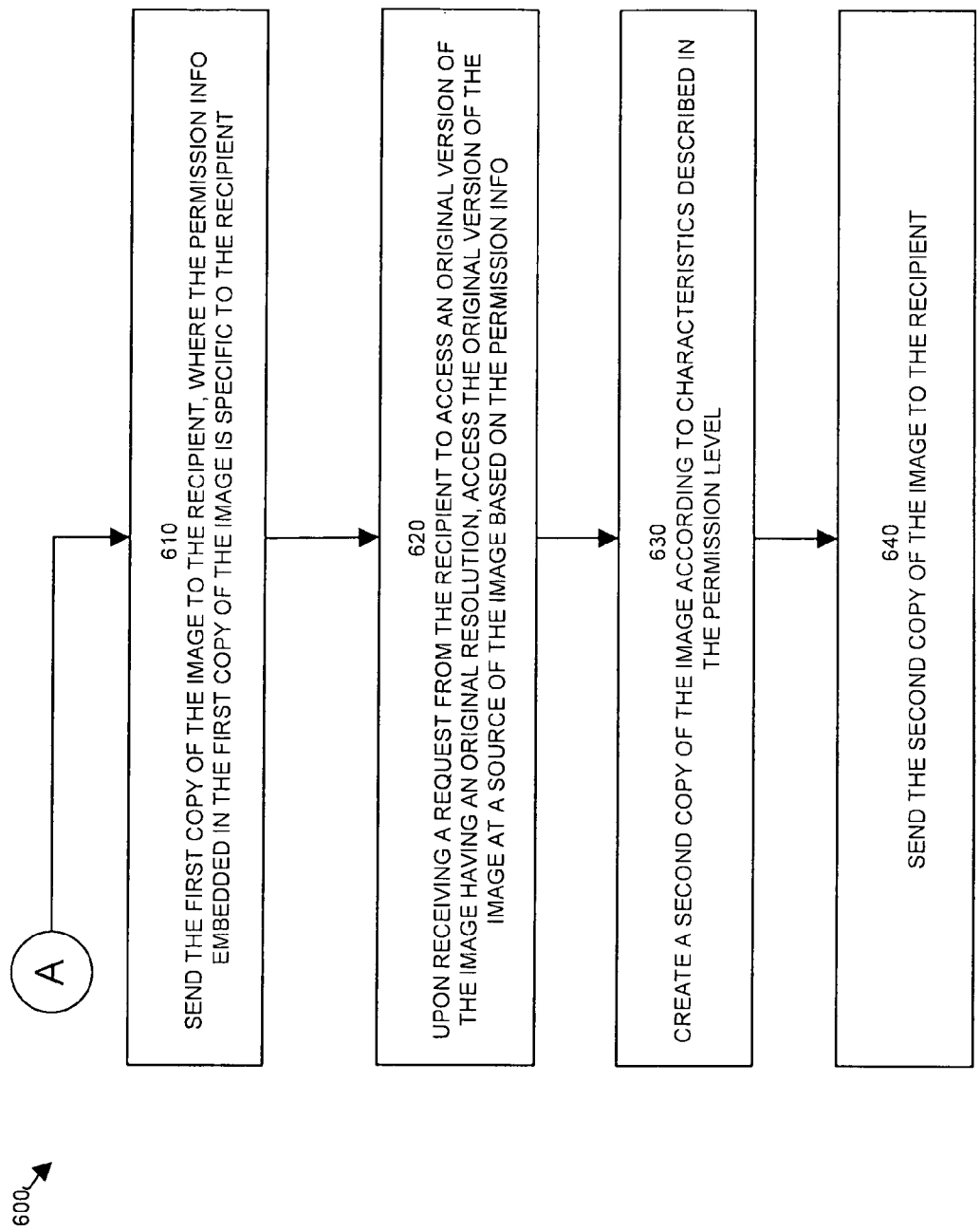
FIG. 6 is a flowchart of an example of processing steps performed by an image transmitter to send to a first copy of an image according to embodiments herein.

FIG. 6 is a flowchart 600 of an example of further processing steps performed by the image transmitter 150 to send to a low-resolution copy of image 161 according to embodiments herein.

At step 610, the image transmitter 150 sends the low-resolution copy of the image 161 to the recipient.

At step 620, upon receiving a request from the recipient to access a higher-resolution version of the image 161, the image transmitter 150 accesses the original version of the image 161 and creates a copy of the original image in accordance with the request.

At step 630, the image transmitter 150 creates a high-resolution copy of the image 161 according to characteristics (i.e., resolution, format, size, etc.) present in the received request. For example, the permission information can specify the different resolution, format type, etc., of the copy of image 161 that can be retrieved by the recipient.

At step 640, the image transmitter 150 sends the high-resolution copy of the image to the recipient.

Figure 7:
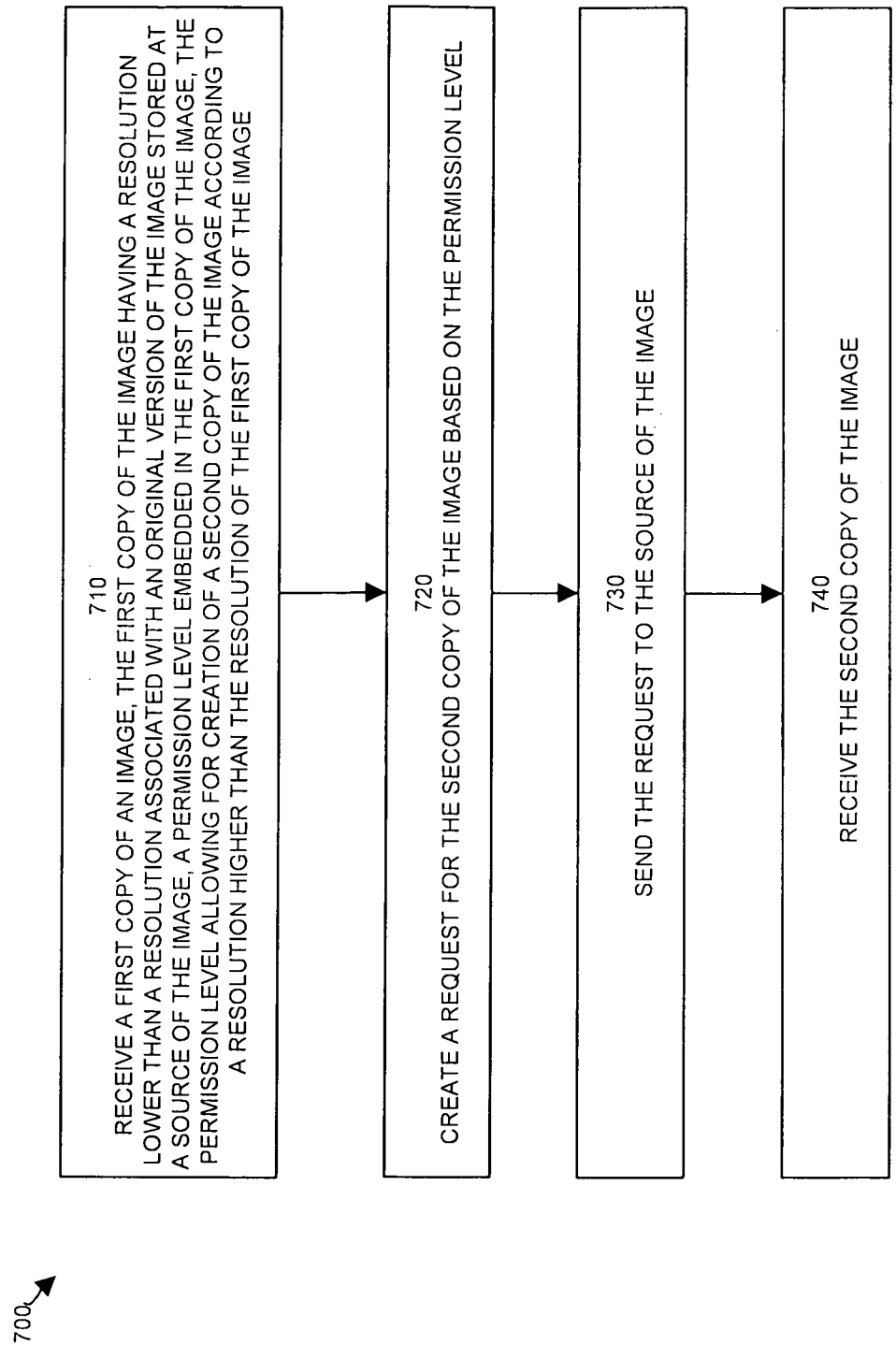
FIG. 7 is a flowchart of an example of processing steps performed by a renderer to send to a request for retrieving copy of an image according to embodiments herein.

FIG. 7 is a flowchart 700 of example processing steps performed by a renderer 250 according to embodiments herein.

At step 710, the renderer 250 receives the low-resolution copy of image 161. The low-resolution copy of the image has a resolution that is lower than a resolution associated with an original version of the image 161. The renderer 250 receives the low-resolution copy of the image 161 with corresponding permission information 164. The permission information allows for creation of a high-resolution copy of the image 161. As its name suggests, the high-resolution copy of the image 161 has a higher resolution than the low-resolution copy of the image 161.

At step 720, the renderer 250 creates a request for the high-resolution copy of the image 161 based on the permission information 164.

At step 730, the renderer 250 sends the request to the source storing the image information associated with image 161.

At step 740, the renderer 250 receives the high-resolution copy of the image 161.

Figure 8:
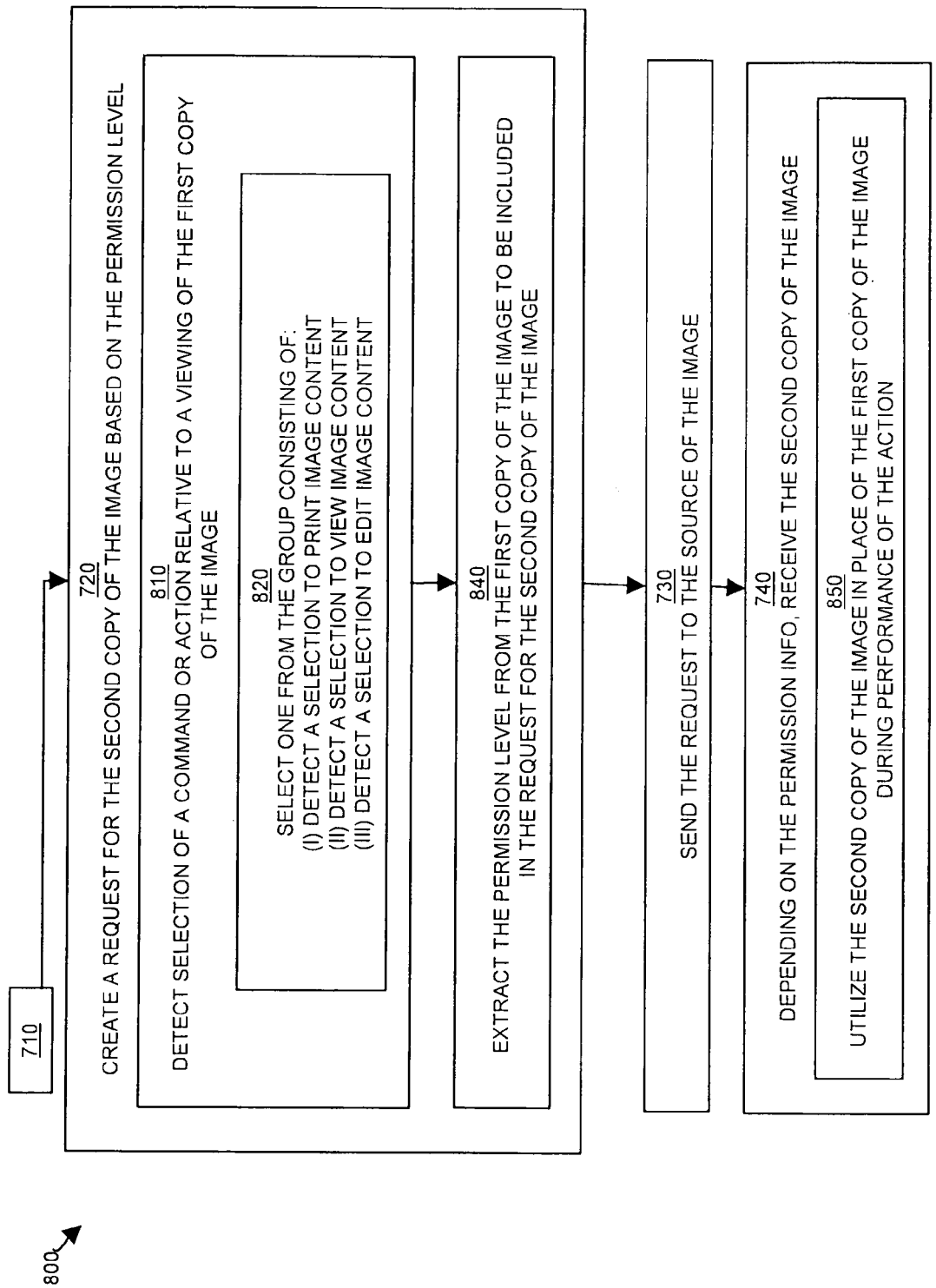
FIG. 8 is a flowchart of an example of processing steps performed by a renderer to create a request for a second copy of an image according to embodiments herein.

FIG. 8 is a flowchart 800 of example processing steps performed by a renderer 250 to create a request for a second copy of an image according to embodiments herein.

At step 810, the renderer 250 detects selection of a command or action relative to a viewing of the low-resolution copy of the image. For example, the renderer 250 detects a selection to print image content, view image content, and/or edit image content (See step 820).

At step 830, the renderer 250 analyzes the permission information associated with the low-resolution copy of the image 161.

At step 840, the renderer 250 extracts the image identifier of the image 161 from the permission information and includes the image identifier in the request for the high-resolution copy of the image.

At step 850, when the renderer 250 receives the high-resolution copy of the image, the renderer 250 utilizes the high-resolution copy of the image in place of the first copy of the image to carry out the command or action selected by the recipient.

Figure 9:
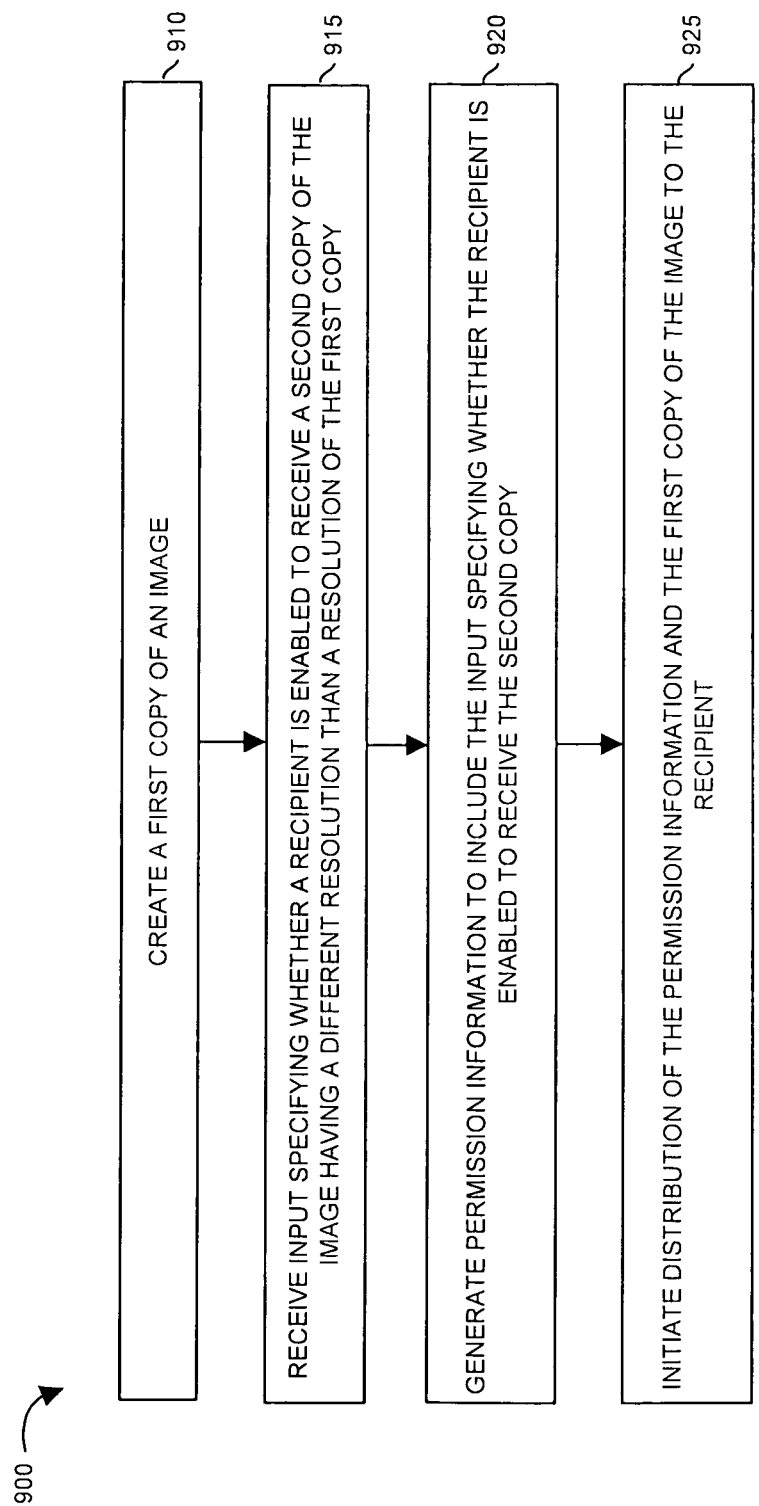
FIGS. 9, 10, and 11 are flowcharts illustrating example processing steps according to embodiments herein.

FIG. 9 is a flowchart 900 of example processing steps performed by a computer system 320-1 for dissemination of image data according to embodiments herein. For a more detailed discussion of steps performed by computer system 320-1, see the discussion above for FIG. 3.

In step 910, the computer system 320-1 creates a low-resolution copy of image 315-L.

In step 915, the computer system 320-1 receives input 304 specifying whether a recipient will be enabled to receive a high-resolution copy of the image 315-H.

In step 920, the computer system 320-1 generates permission information 325 to include the input 304 specifying whether the recipient is enabled to receive the high-resolution copy of the image 315-H.

In step 925, the computer system 320-1 initiates distribution of the permission information 325 and the low-resolution copy of the image 315-L.

Figure 10:
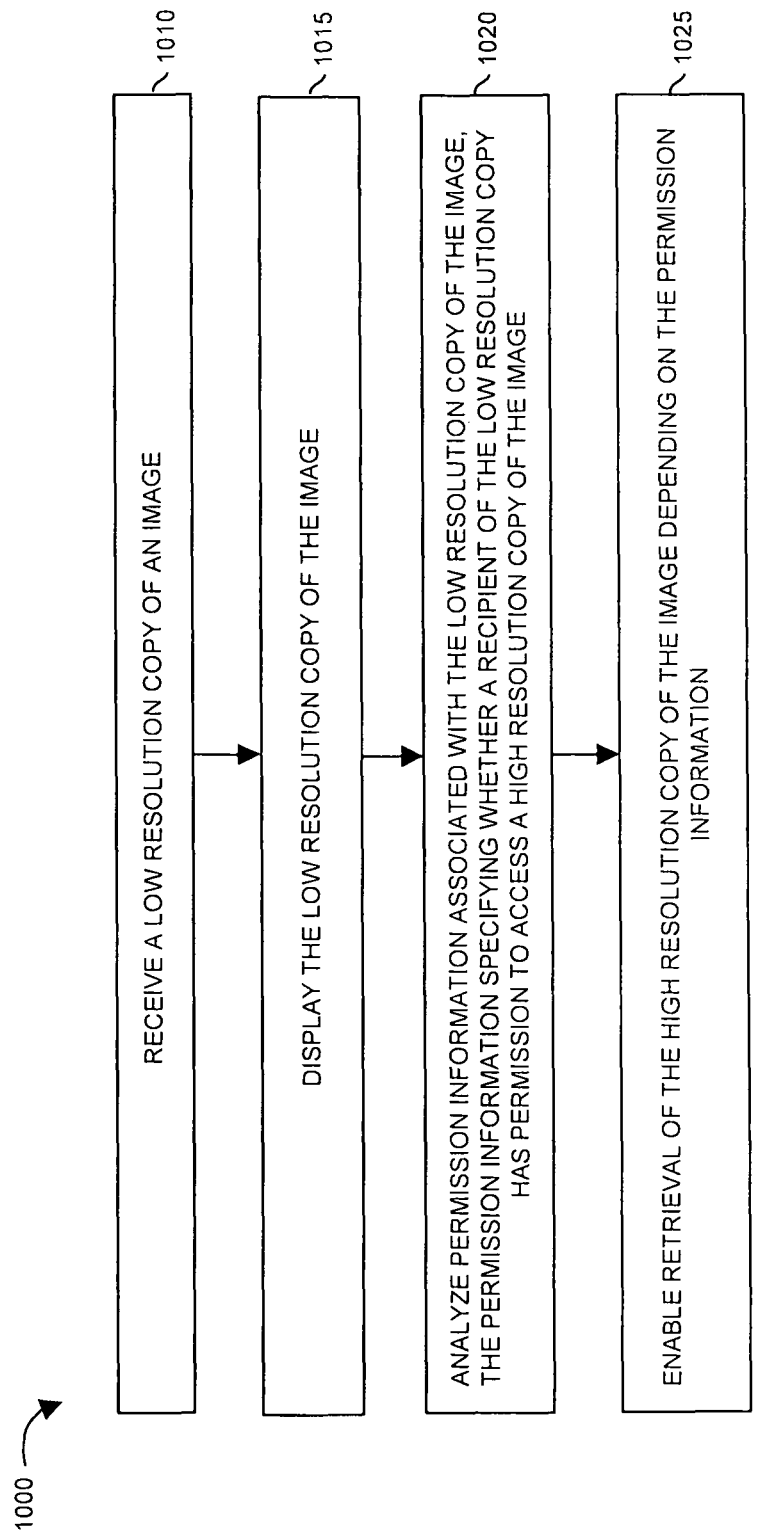

FIG. 10 is a flowchart 1000 of example processing steps performed by a recipient computer system 340 according to embodiments herein. For a more detailed discussion of steps performed by recipient computer systems 340, see the discussion above for FIG. 3.

In step 1010, the computer system 340 receives a low-resolution copy of an image 315-L.

In step 1015, the computer system 340 displays the low-resolution copy of the image 315-L for viewing.

In step 1020, the computer system 340 analyzes received permission information 325 associated with the low-resolution copy of the image 315-L. The permission information 325 specifies whether the recipient of the low-resolution copy of the image 315-L has permission to access a high-resolution copy of the image 315-H.

In step 1025, the computer system 340 enables retrieval of the high-resolution copy of the image 315-H depending on the permission information.

Figure 11:
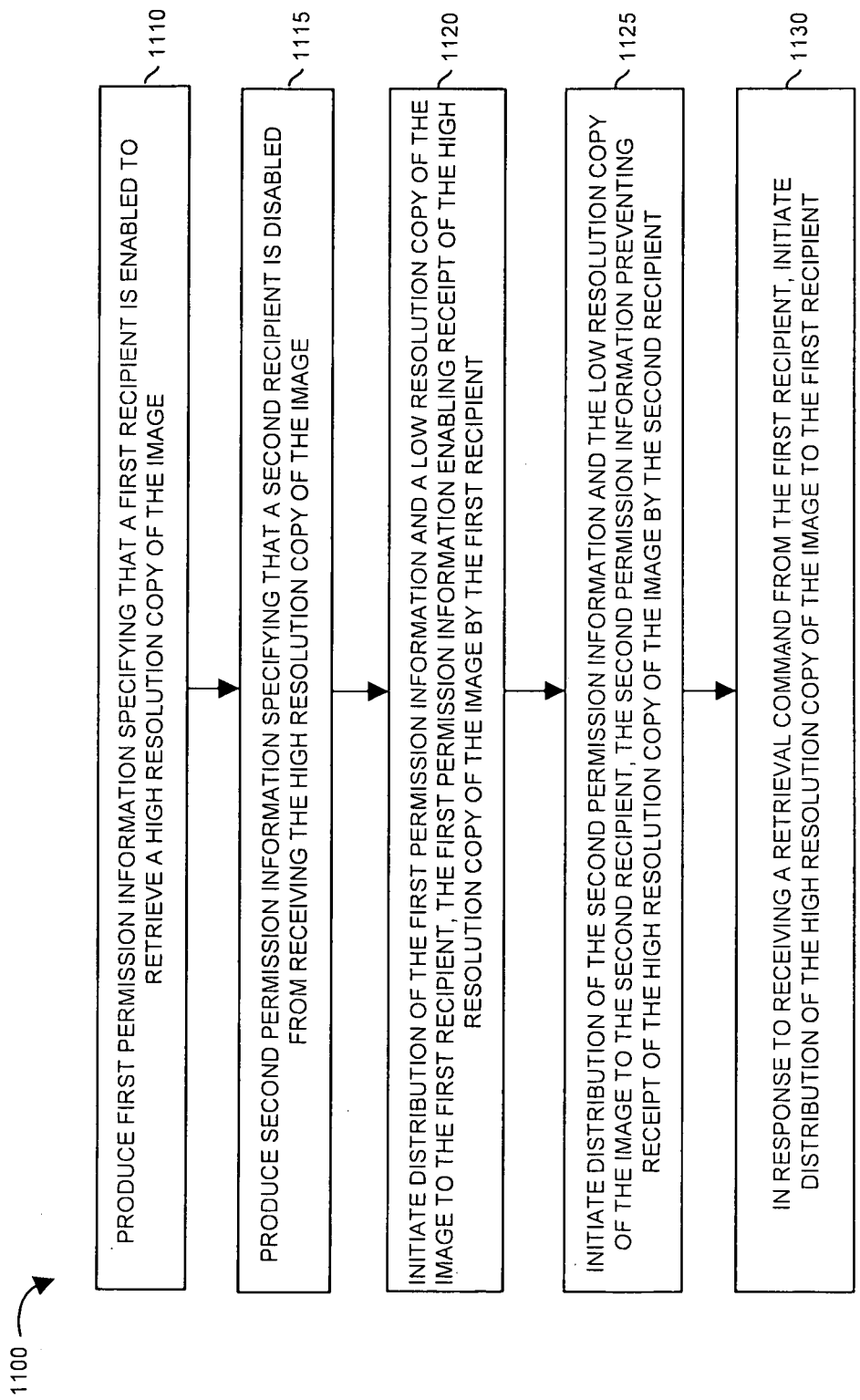

FIG. 11 is a flowchart 1100 of example processing steps performed by system 300 according to embodiments herein. For a more detailed discussion of steps performed by system 300 and corresponding resources in system 300, see the discussion above for FIG. 3.

In step 1110, the computer system 340 produces permission information 325-1 specifying that a recipient computer system 340-1 is enabled to retrieve a high-resolution-copy of the image 315-H.

In step 1115, the computer system 340 produces permission information 325-2 specifying that recipient computer system 340-2 is disabled from receiving the high-resolution copy of the image 315-H.

In step 1120, the computer system 340 initiates distribution of the permission information 325-1 and a low-resolution copy of the image to recipient computer system 340-1. The permission information 325-1 enables receipt of the high-resolution copy of the image 315-H.

In step 1125, the computer system 340 initiates distribution of the permission information 325-2 and the low-resolution copy of the image 315-L to the recipient computer system 340-2. The permission information 340-2 prevents receipt of the high-resolution copy of the image 315-H by the recipient computer system 340-2.

In step 1130, in response to receiving a retrieval command from the recipient computer system 340-1, the source 345 initiates distribution of the high-resolution copy of the image 315-H to the recipient computer system 340-1.

Those skilled in the art will understand that there can be many variations made to the operations of the user interface explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

What is claimed is:

1. A computer-implemented method comprising:
   creating, by a processor, a first copy of an image;
   receiving, by the processor, input specifying whether a recipient device is enabled to receive a second copy of the image having a different resolution than a resolution of the first copy;
   generating, by the processor, permission information based on the input, the permission information specifying that the recipient device is enabled to receive the first copy and whether the recipient device is enabled to receive the second copy having the different resolution; and
   initiating, by the processor, distribution of the permission information with the first copy of the image to the recipient device.

2. The computer-implemented method as in claim 1, wherein creating the first copy of the image includes creating the first copy of the image to have a lower resolution than an original resolution of the image, the method further comprising:
   creating, by the processor, the second copy of the image to have a higher resolution than the first copy of the image.

3. The computer-implemented method as in claim 1 further comprising:
   encoding, by the processor, the permission information to include format information specifying at least one corresponding format in which the second copy of the image can be retrieved by the recipient device.

4. The computer-implemented method as in claim 1 further comprising:
   receiving, by the processor, a request from the recipient device;
   in response to receiving the request from the recipient device, initiating, by the processor, distribution of the second copy of the image to the recipient device, the second copy of the image having a higher resolution than a resolution of the first copy of the image.

5. The computer-implemented method as in claim 1 further comprising:
   generating, by the processor, the permission information to include a source identifier specifying a source from which the second copy can be retrieved; and
   wherein distribution of the permission information includes distributing the source identifier to the recipient device along with the first copy, the source identifier enabling the recipient device to identify a location in which the second copy is stored for retrieval by the recipient device.

6. The computer-implemented method as in claim 5 further comprising:
   generating, by the processor, the permission information to include an image identifier specifying the image as a corresponding resource from which the first copy is derived; and
   wherein initiating distribution of the permission information includes distributing the image identifier to the recipient device along with the first copy.

7. The computer-implemented method as in claim 1 further comprising:
   generating, by the processor, the permission information to specify whether the second copy of the image can be edited by the recipient device.

8. The computer-implemented method as in claim 1 further comprising:
   generating, by the processor, the permission information to specify whether the second copy of the image can be printed by the recipient device.

9. A computer program product including a non-transitory computer-storage medium having instructions stored thereon and executable by a processing device for processing data information, such that the instructions, when carried out by the processing device, enable the processing device to perform operations of:
   creating a first copy of an image;
   receiving input specifying whether a recipient device is enabled to receive a second copy of the image having a different resolution than a resolution of the first copy;
   generating permission information based on the input, the permission information specifying that the recipient device is enabled to receive the first copy and whether the recipient device is enabled to receive the second copy having the different resolution; and
   initiating distribution of the permission information and the first copy of the image to the recipient device.

10. The computer program product as in claim 9, wherein creating the first copy of the image includes creating the first copy of the image to have a lower resolution than an original resolution of the image, the computer program product further supporting operations of:
    creating the second copy of the image to have a higher resolution than the first copy of the image.

11. The computer program product as in claim 9 further supporting operations of:
    encoding the permission information to include format information specifying at least one corresponding format in which the second copy of the image can be retrieved by the recipient device.

12. The computer program product as in claim 9 further supporting operations of:
    receiving a request from the recipient device;
    in response to receiving the request from the recipient device, initiating distribution of the second copy of the image to the recipient device, the second copy of the image having a higher resolution than a resolution of the first copy of the image.

13. The computer program product as in claim 9 further supporting operations of:
    generating the permission information to include a source identifier specifying a source from which the second copy can be retrieved; and
    wherein distribution of the permission information includes distributing the source identifier to the recipient device along with the first copy, the source identifier enabling the recipient device to identify a location in which the second copy is stored for retrieval by the recipient device.

14. The computer program product as in claim 13 further supporting operations of:
    generating the permission information to include an image identifier specifying the image as a corresponding resource from which the first copy is derived; and
    wherein initiating distribution of the permission information includes distributing the image identifier to the recipient device along with the first copy.

* * * * *